United States Patent
An et al.

(10) Patent No.: US 9,843,821 B2
(45) Date of Patent: Dec. 12, 2017

(54) METHOD OF INTER-VIEW ADVANCED RESIDUAL PREDICTION IN 3D VIDEO CODING

(71) Applicant: HFI INNOVATION INC., Zhubei, Hsinchu County (TW)

(72) Inventors: Jicheng An, Beijing (CN); Kai Zhang, Beijing (CN); Xianguo Zhang, Beijing (CN); Han Huang, Beijing (CN); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 14/916,170

(22) PCT Filed: Jun. 24, 2015

(86) PCT No.: PCT/CN2015/082169
§ 371 (c)(1),
(2) Date: Mar. 2, 2016

(87) PCT Pub. No.: WO2015/196988
PCT Pub. Date: Dec. 30, 2015

(65) Prior Publication Data
US 2016/0219304 A1    Jul. 28, 2016

Related U.S. Application Data

(63) Continuation-in-part of application No. PCT/CN2014/080615, filed on Jun. 24, 2014.

(51) Int. Cl.
*H04N 19/52* (2014.01)
*H04N 19/597* (2014.01)
(Continued)

(52) U.S. Cl.
CPC ........... *H04N 19/597* (2014.11); *H04N 19/52* (2014.11); *H04N 19/537* (2014.11); *H04N 19/573* (2014.11)

(58) Field of Classification Search
CPC .... H04N 19/52; H04N 19/597; H04N 19/573; H04N 19/537
(Continued)

(56) References Cited

U.S. PATENT DOCUMENTS

| | | | |
|---|---|---|---|
| 2014/0078250 A1 | 3/2014 | Zhang et al. |
| 2014/0078254 A1 | 3/2014 | Lin et al. |
| 2014/0161175 A1 | 6/2014 | Zhang et al. |

FOREIGN PATENT DOCUMENTS

| | | |
|---|---|---|
| CN | 103139555 | 6/2013 |
| CN | 103597837 | 2/2014 |

(Continued)

OTHER PUBLICATIONS

International Search Report dated Aug. 26, 2015, issued in application No. PCT/CN2015/082169.

*Primary Examiner* — Nguyen Truong
(74) *Attorney, Agent, or Firm* — McClure, Qualey & Rodack, LLP

(57) ABSTRACT

A method and apparatus for inter-view ARP (advanced residual prediction) are disclosed. According to one embodiment, a first inter-view reference block of a first inter-view reference picture in a first reference view is determined using a current MV (motion vector) of the current block in an inter-view direction. A first MV associated with the first inter-view reference block is derived. If the first MV points to a second inter-view reference picture in a second reference view, the derived MV is set to a default derived MV. A second temporal reference block in the second temporal reference picture corresponding to the current block is identified using the derived MV. An inter-view residual
(Continued)

predictor corresponding to the difference between a second inter-view reference block in the first reference view and the second temporal reference block is generated and used as a predictor for the current inter-view residual of the current block.

10 Claims, 4 Drawing Sheets

(51) Int. Cl.
      *H04N 19/537*    (2014.01)
      *H04N 19/573*    (2014.01)

(58) Field of Classification Search
      USPC .................................................... 375/240.16
      See application file for complete search history.

(56) References Cited

FOREIGN PATENT DOCUMENTS

| WO | WO 2014/056423 | 4/2014 |
|----|----------------|--------|
| WO | WO 2014/075236 | 5/2014 |

METHOD OF INTER-VIEW ADVANCED RESIDUAL PREDICTION IN 3D VIDEO CODING

CROSS REFERENCE TO RELATED APPLICATIONS

The present application is a national phase application of PCT Patent Application Serial No. PCT/CN2015/082169, which is a continuation in part of PCT Patent Application, Serial No. PCT/CN2014/080615, filed on Jun. 24, 2014, which is hereby incorporated by reference in its entirety.

FIELD OF INVENTION

The present invention relates to three-dimensional video coding. In particular, the present invention relates to inter-view advanced residual prediction (ARP) in a three-dimensional (3D) or multi-view coding system.

BACKGROUND OF THE INVENTION

Three-dimensional (3D) television has been a technology trend in recent years that intends to bring viewers sensational viewing experience. Various technologies have been developed to enable 3D viewing and the multi-view video is a key technology for 3DTV application among others. Since all cameras capture the same scene from different viewpoints, multi-view video data contains a large amount of inter-view redundancy. To exploit the inter-view redundancy, additional tools such as advanced residual prediction (ARP) have been integrated to conventional 3D-HEVC (High Efficiency Video Coding) or 3D-AVC (Advanced Video Coding) codec. When ARP is used, the residual for the current block is predicted by a corresponding residual.

There are two types of ARP representing inter-view ARP and temporal ARP. If the current motion vector (MV) is in the inter-view direction (i.e., a disparity MV), the ARP is called inter-view ARP. For the inter-view ARP, the current inter-view residual is predicted by a corresponding inter-view residual from the temporal direction. If the current MV is in the temporal direction, the ARP is called temporal ARP. For the temporal ARP, the current temporal residual is predicted by a corresponding temporal residual from the inter-view direction. The basic concept of the inter-view ARP in existing 3DV-HEVC is illustrated in FIG. 1. The current picture (110) and temporal reference picture (120) correspond to two pictures in the current view. The inter-view prediction residual for a current picture is predicted by the inter-view prediction residual in a different access unit (i.e., different picture order count, POC). For example, an inter-view predictor for the current block (112) in the current picture (110) can be determined based on a motion vector (130) in the inter-view direction (i.e., a disparity vector, DV). The block structure used for the ARP process may correspond to a prediction unit, PU. In other words, the current block corresponds to a current PU. A corresponding temporal reference block (122) for the current block (112) can be located from the current block (112) in the temporal reference picture (120) using a derived MV (DMV 140). The MV (130) in the inter-view direction is also applied to find an inter-view predictor for the temporal reference block (122). The inter-view residual associated with the temporal reference block (122) in a POC different from the POC of the current picture is used to predict the inter-view residual associated with the current block (112).

FIG. 2 illustrates an example of the derivation procedure of DMV for the case in FIG. 1. First, the inter-view reference block (212) in a corresponding inter-view reference picture (210) is located based on the current block (112) using the current MV (130) in the inter-view direction. Since the inter-view reference picture (210) has been coded before the current picture, a motion vector (230) can be determined for the inter-view reference block (212). The MV (230) points to a temporal reference block (222) of a temporal reference picture (220) in the reference view. The MV (230) is scaled to obtain the derived MV (DMV 140). The example shown in FIG. 2 illustrates a case where the MV (230) points to a temporal reference picture (220) that is, based on the display order, temporally farther away from the current picture (110) than the current temporal picture (120). The temporal picture (120) is determined as ARP reference picture in slice level. Therefore, the MV (230) has to be scaled down to derive the DMV (140) in this case. However, the temporal reference picture (220) could also be closer to the current picture (110) than the temporal picture (120). In this case, the MV (230) has to be scaled up to derive the DMV (140). If the POC of the temporal reference picture (220) (i.e., POC1) is equal to the POC of the temporal picture (120) (i.e., POC2), then the scaling has no need.

After the DMV (140) is derived, the temporal reference block (122) in the current view (i.e., dependent view) can be located. The inter-view prediction residual for the temporal reference block (122) can be determined based on the difference between temporal reference block (122) in the dependent view and its corresponding inter-view reference block in the reference view, where the inter-view reference block is located based on the location of the temporal reference block (122) and the MV (130) in the inter-view direction. According to inter-view ARP, the inter-view prediction residual is then used as a prediction for the current inter-view prediction residual.

The scaling process is well-known in the field of video coding. The MV scaling is performed according to the POC distance. The particular implementation adopted in the existing 3D-HEVC is described as follows, where input is the MV (230) and output is the DMV(140):

$$tx=(16384+(Abs(td)>>1))/td \quad (1)$$

$$distScaleFactor=Clip3(-4096,4095,(tb*tx+32)>>6) \quad (2)$$

$$DMV=Clip3(-32768,32767,Sign\\(distScaleFactor*MV)*((Abs\\(distScaleFactor*MV)+127)>>8)), \quad (3)$$

where td and tb are derived as:

$$td=Clip3(-128,127,POC0-POC1) \quad (4)$$

$$tb=Clip3(-128,127,POC0-POC2) \quad (5)$$

As shown in equation (1), a division by td operation is performed and td corresponds to the POC distance between POC0 and POC1 (i.e., POC0−POC1), The difference is further clipped to a range from −128 to +127 as shown in equation (4). When POC1 is the same as the POC0, td will be 0. The scaling process becomes meaningless and would result in coder crash since the denominator td is equal to 0 in equation (1). This situation may occur when the MV of the inter-view reference block is in the inter-view direction as shown in FIG. 3. The current MV (330) in the inter-view direction points to an inter-view reference block (312) in an inter-view reference picture (310) in reference view j. However, the MV (340) associated with the inter-view reference block (312) points to another inter-view reference picture (320) the inter-view direction. The POC of said another inter-view reference picture (320) is the same as the POC of the current picture (i.e., POC1=POC0). Therefore, td=POC0−POC1=0 and this will cause an issue in the MV scaling process. It is noted that FIG. 2 and FIG. 3 illustrate DMV derivation process for two different cases. In FIG. 2, the inter-view reference block (212) points to a temporal reference picture. In FIG. 3, the inter-view reference block (312) points to another inter-view reference picture. After DMV is derived, the DMV is used to locate a temporal reference block (122) for the current block as shown in FIG. 1. Furthermore, the inter-view residual predictor is formed and is used to predict the current inter-view residual using the structure shown in FIG. 1.

Therefore, it is desirable to develop a method to overcome this MV scaling issue.

SUMMARY OF THE INVENTION

A method and apparatus for inter-view ARP (advanced residual prediction) in a three-dimensional or multi-view video coding system are disclosed. According to one embodiment, a first inter-view reference block of a first inter-view reference picture in a first reference view is located from the current block using a current MV (motion vector) of the current block in an inter-view direction. A first MV associated with the first inter-view reference block is then derived. If the first MV points to a first temporal reference picture in the first reference view, a derived MV is determined based on the first MV. If the first MV points to a second inter-view reference picture in a second reference view, the derived MV is set to a default derived MV. A second temporal reference block in the second temporal reference picture corresponding to the current block is identified using the derived MV. An inter-view residual predictor corresponding to a first difference between a second inter-view reference block in the first reference view and the second temporal reference block is generated, where the second inter-view reference block is located from the location of the second temporal reference block using the current MV of the current block in the inter-view direction. The inter-view residual predictor is then used as a predictor for the current inter-view residual corresponding to the difference between the first inter-view reference block and the current block.

The default derived MV may correspond to a default value (0, 0). If the current picture has a POC (picture order count) equal to POC0, the first temporal reference picture in the first reference view has the POC equal to POC1, the second temporal reference picture in the dependent view has the POC equal to POC2, the derived MV can be derived based on the first MV according a ratio between (POC1−POC0) and (POC2−POC0). The second inter-view reference picture has a same POC as current picture. Also, the second temporal reference picture may correspond to an ARP temporal reference picture as derived in a slice level.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned above, the coding practice of inter-view advanced residual prediction (ARP) according to existing 3D-HEVC draft may result in a MV associated with the inter-view reference block pointing in the inter-view direction to an inter-view reference picture in another reference view. Therefore, this MV points to an inter-view reference picture having the same picture order count (POC) as the current picture. This would cause an issue when the MV scaling in performed. To avoid the meaningless and problematic MV scaling in the existing 3D-HEVC practice, the present invention discloses a method and apparatus to overcome the issue.

Figure 1:
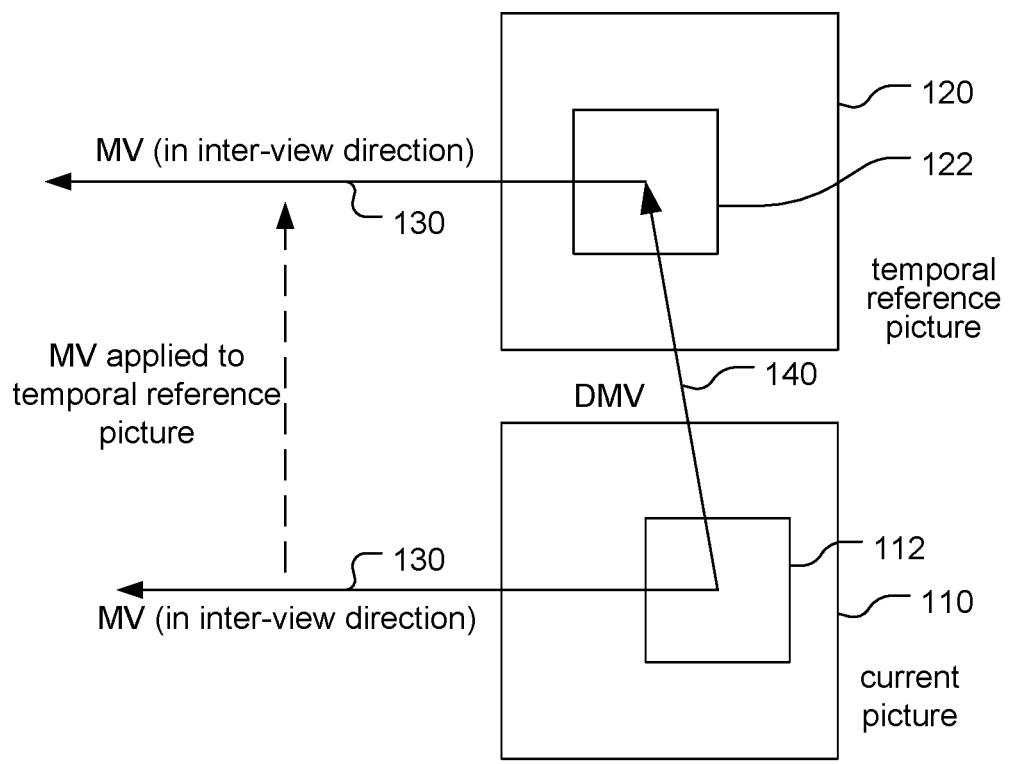
FIG. 1 illustrates an example of inter-view advanced residual prediction (ARP) structure, where the inter-view prediction residual for a current block is predicted by the inter-view prediction residual for a temporal reference block.
Figure 3:
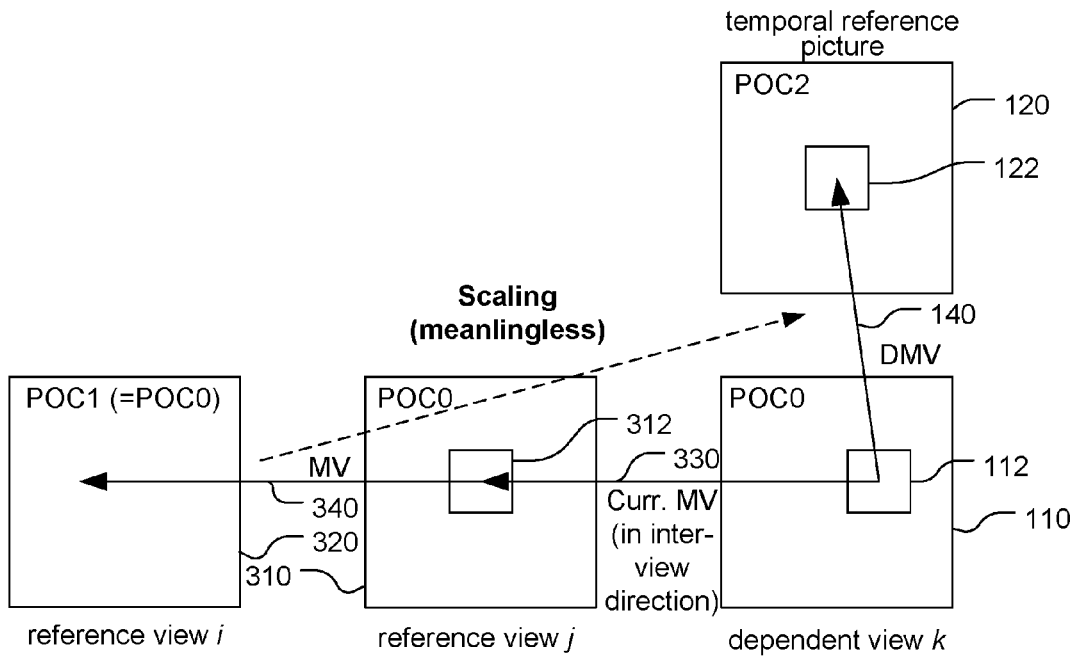
FIG. 3 illustrates an example of DMV (derived motion vector) derivation process associated with the inter-view advanced residual prediction (ARP) according to existing 3D-HEVC (three-dimensional coding based on high efficiency video coding), where the motion vector associated with an inter-view reference block for the current block points to another inter-view reference picture.
Figure 4:
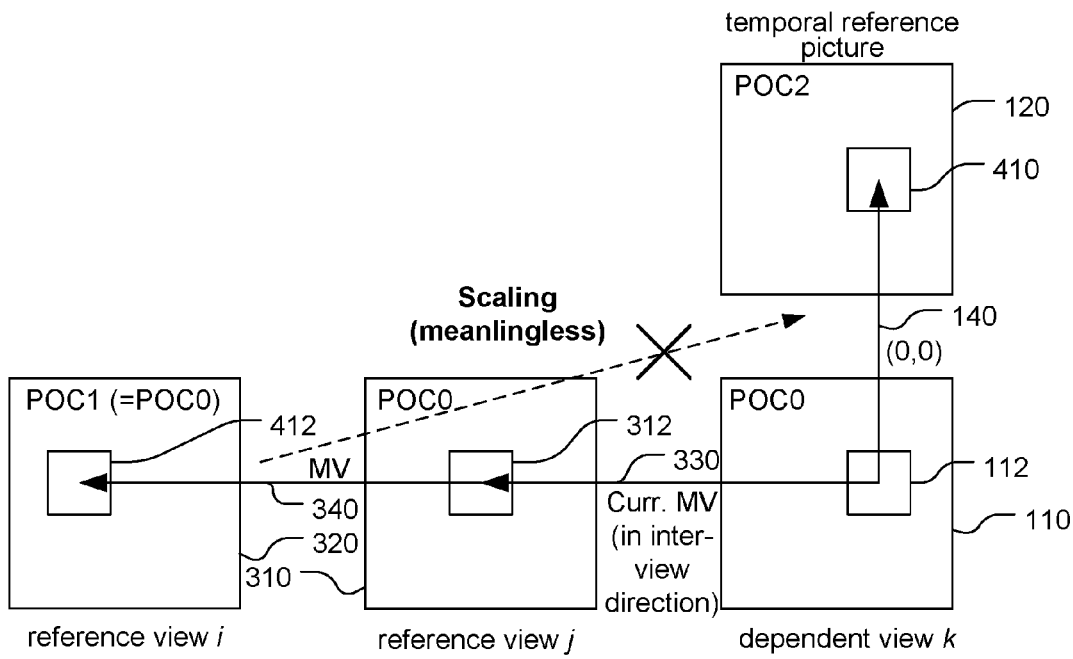
FIG. 4 illustrates an example of DMV (derived motion vector) derivation process according to an embodiment of the present invention, where the motion vector associated with an inter-view reference block for the current block points to another inter-view reference picture and a default DMV with a default value equal to (0, 0) is used.

FIG. 4 illustrates an example incorporating an embodiment of the present based on the case of FIG. 3. A default DMV is used if the MV (340) associated with the inter-view reference block (312) of a first inter-view reference picture (310) in reference view j for the current block (112) is in the inter-view direction. In this case, the MV (340) points to an inter-view reference block (412) of another inter-view reference picture (320) corresponding to another reference view (reference view i) having a same POC (i.e., POC1) as the POC (i.e., POC0) of the current picture. The reference block (312) is located by a current MV (330) in the inter-view direction from the current block (112). In this case, no MV scaling is applied as indicated by an "X". Instead, the DMV is directly set to the default value. For example, the default DMV can be set to (0, 0). When the default DMV value (0, 0) is used, a temporal reference block (410) of the reference picture (120) in the current view (i.e., dependent view k) is located. The temporal picture (120) may correspond to an ARP temporal reference picture as derived in a slice level. Since the default DMV has a value (0, 0), the temporal reference block (410) is at the same location as current block (112). The inter-view prediction residual for the temporal reference block (410) can be determined according to inter-view residual prediction structure as shown in FIG. 1. In other words, the inter-view prediction residual is formed based on the difference between the temporal reference block (410) in the dependent view and a corresponding inter-view reference block in the reference view, which is located from the temporal reference block (410) using the current MV (130) in the inter-view direction. According to inter-view ARP, the inter-view prediction residual is then used as a prediction for the current inter-view prediction residual.

The present invention can be applied to the existing 3D-HEVC by modifying the existing syntax/semantics. For example, the related part of the draft text of existing 3D-HEVC (JCT3V-H1001_v2) in section 1.8.5.3.3.7.4, can be modified as shown in the Table 1:

TABLE 1

I 8.5.3.3.7.4 Derivation process for a motion vector from a reference block for residual prediction ...
When the variable CuPredMode for the coding unit refCU is equal to MODE_SKIP or MODE_INTER, the following applies for X in the range of 0 to 1, inclusive:
   The variable refPredFlagLX is set equal to the prediction utilization flag predFlagLX of the prediction unit refPU.
   When availFlag is equal to 0 and refPredFlagLX is equal to 1, the following applies:
      i. Let refPicListRefX be the reference picture list X of refPic.
      ii. Let mvLX and refIdxLX be the motion vector and reference index of the prediction unit refPU corresponding to refPicListRefX, respectively.
      iii. When PicOrderCnt(refPicListRefX[ refIdxLX ]) is not equal to PicOrderCnt(refPic) (*refPicListRefX[ refIdxLX ] is a temporal reference picture of refPic*) and RpRefIdxLX is not equal to −1, availFlag is set to 1, Y is set equal to X and the residual prediction motion vector scaling process as specified in subclause I.8.5.3.3.7.3 is invoked with the prediction list utilization variable equal to X, the motion vector mvLX, and the reference picture refPicListRefX[ refIdxLX ] as inputs, and the output being mvT.

Figure 2:
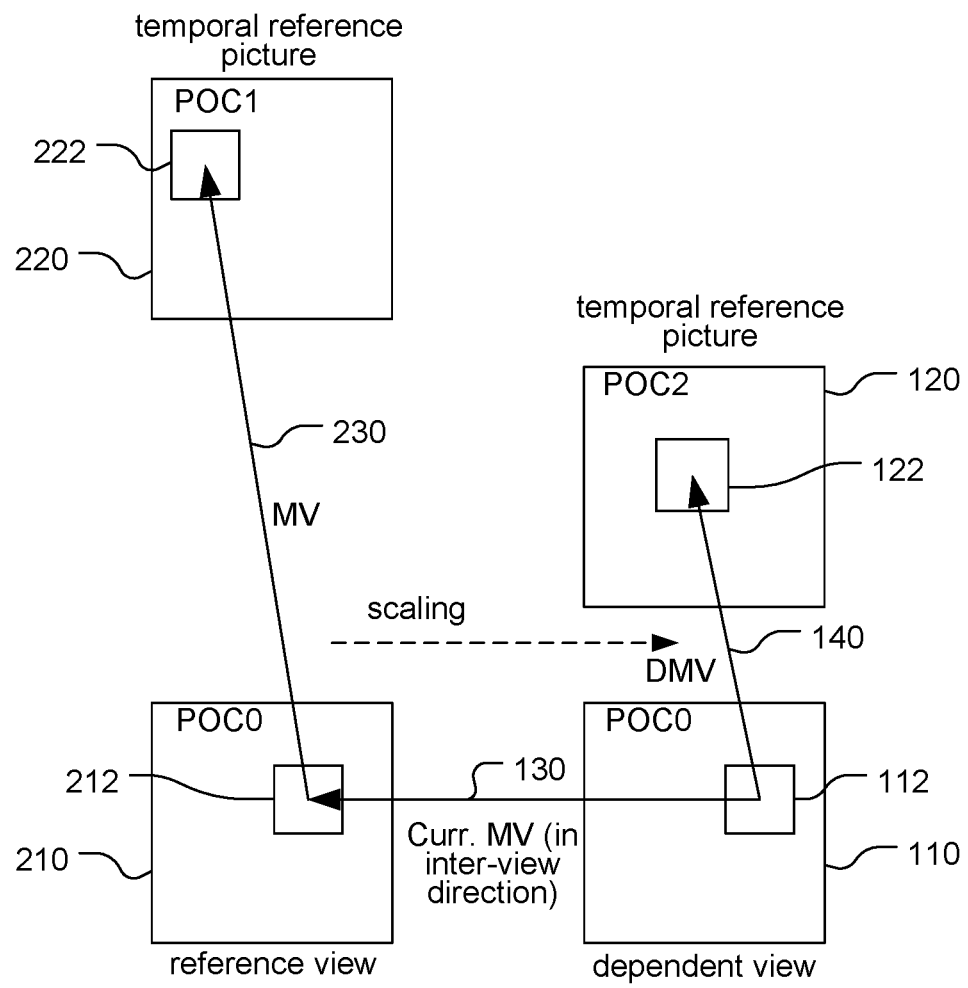
FIG. 2 illustrates an example of DMV (derived motion vector) derivation process associated with the inter-view advanced residual prediction (ARP) according to existing 3D-HEVC (three-dimensional coding based on high efficiency video coding).

In the above exemplary implementation based on existing 3D-HEVC standard, new text "PicOrderCnt(refPicListRefX [refIdxLX]) is not equal to PicOrderCnt(refPic)" is added as indicated by the bold text style. Also, original text "refPicListRefX[refIdxLX] is a temporal reference picture of refPic" in parenthesis is deleted as indicated the italic text style. In (iii) of Table 1, subclause 1.8.5.3.3.7.3 describes the Residual prediction motion vector scaling process. In other words, the scaling process is invoked when PicOrderCnt (refPicListRefX[refIdxLX]) is not equal to PicOrderCnt (refPic) and RpRefIdxLX is not equal to −1. In which, PicOrderCnt(refPicListRefX[refIdxLX] corresponds to the POC of a reference picture of the reference block of the current block (i.e., the prediction unit refPU), in the example shown in FIG. 2, PicOrderCnt(refPicListRefX[refIdxLX] corresponds to the POC pointed by the MV (230) (i.e., the POC of the temporal reference picture (220)); in the examples shown in FIG. 3 and FIG. 4, PicOrderCnt(refPicListRefX[refIdxLX] corresponds to the POC pointed by the MV (340) (i.e., the POC of the inter-view reference picture (320)). PicOrderCnt(refPic) corresponds to the POC of a reference picture where the reference block of the current block is located therein. In the example shown in FIG. 2, PicOrderCnt(refPic) corresponds to the POC of the inter-view reference picture (210); in the examples shown in FIG. 3 and FIG. 4, PicOrderCnt(refPic) corresponds to the POC of inter-view reference picture (310) pointed by the current MV (330) in the inter-view direction.

Figure 5:
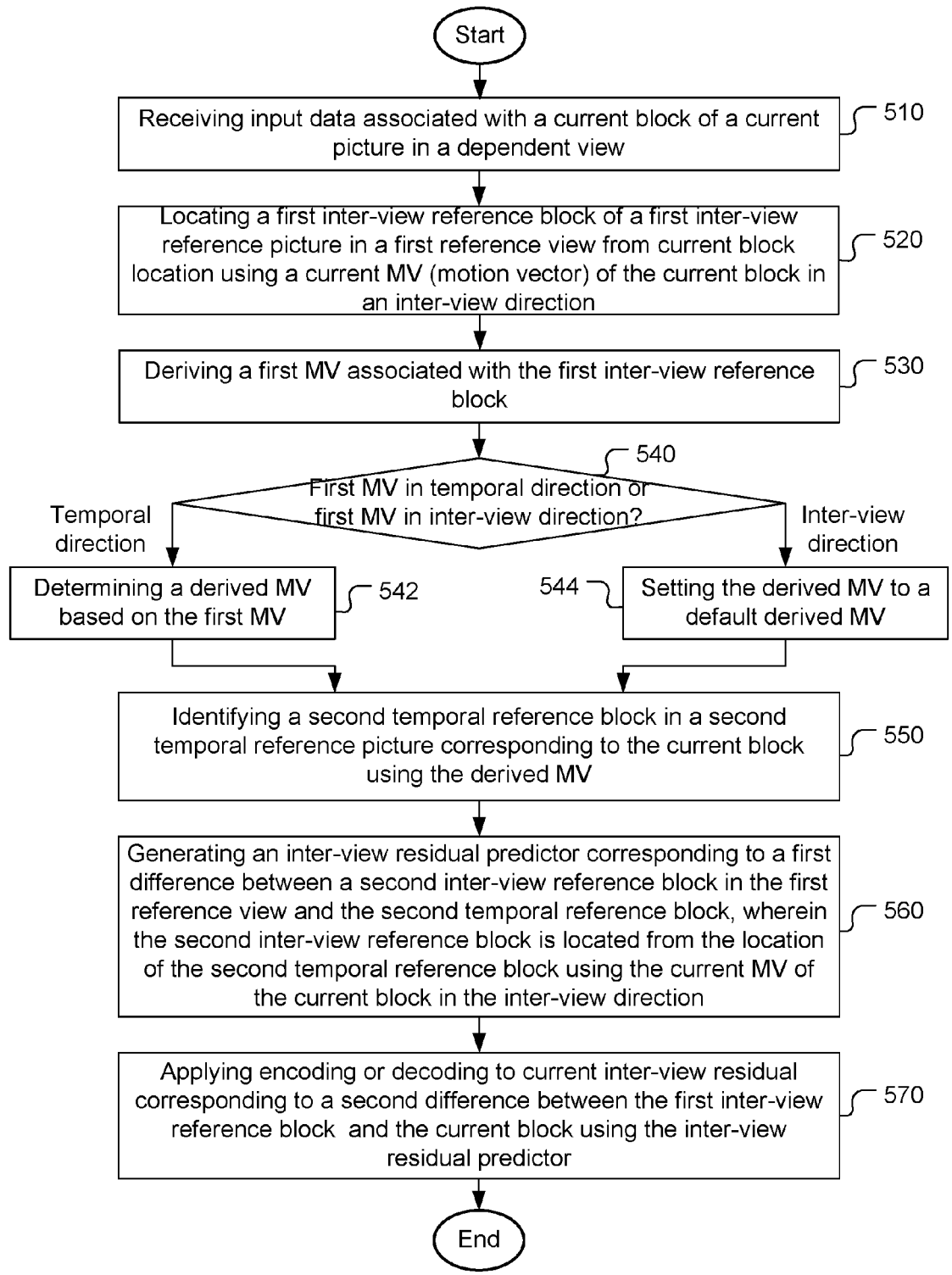
FIG. 5 illustrates an exemplary flowchart for inter-view advanced residual prediction (ARP) according to an embodiment of the present invention, where a default DMV (derived motion vector) is used when the motion vector associated with an inter-view reference block for the current block points to another inter-view reference picture.

FIG. 5 illustrates an exemplary flowchart for inter-view advanced residual prediction (ARP) according to an embodiment of the present invention, where a default DMV (derived motion vector) is used when the motion vector associated with an inter-view reference block for the current block points to another inter-view reference picture. The system receives input data associated with a current block of a current picture in a dependent view in step 510. For encoding, the input data corresponds to the texture data or depth data to be encoded. For decoding, the input data corresponds to coded texture data or depth data to be decoded. The input data may be retrieved from memory (e.g., computer memory, buffer (RAM or DRAM) or other media) or from a processor. A first inter-view reference block of a first inter-view reference picture in a first reference view is located from the current block location using a current MV (motion vector) of the current block in an inter-view direction in step 520. A first MV associated with the first inter-view reference block is derived in step 530. Whether the first MV points to a temporal direction or an inter-view direction is determined in step 540. If the result is "temporal direction", a derived MV is determined based on the first MV in step 542. If the result is "inter-view direction", the derived MV is set to a default derived MV in step 544. After the derived MV is determined in either step 542 or step 544, a second temporal reference block of a second temporal reference picture in the dependent view is identified using a derived MV in step 550. In step 560, an inter-view residual predictor corresponding to a first difference between a second inter-view reference block in the first reference view and the second temporal reference block is generated, where the second inter-view reference block is located from the location of the second temporal reference block using the current MV of the current block in the inter-view direction. In step 570, encoding or decoding is applied to current inter-view residual corresponding to a second difference between the first inter-view reference block and the current block using the inter-view residual predictor.

The flowchart shown above is intended to illustrate examples of inter-view ARP according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-view ARP (advanced residual prediction) for three-dimensional or multi-view video coding, the method comprising:
receiving input data associated with a current block of a current picture in a dependent view;
locating a first inter-view reference block of a first inter-view reference picture in a first reference view from current block location using a current MV (motion vector) of the current block in an inter-view direction;
deriving a first MV associated with the first inter-view reference block;
if the first MV points to a first temporal reference picture in the first reference view, determining a derived MV based on the first MV;
if the first MV points to a second inter-view reference picture in a second reference view, setting the derived MV to a default derived MV;
identifying a second temporal reference block in a second temporal reference picture corresponding to the current block using the derived MV;
generating an inter-view residual predictor corresponding to a first difference between a second inter-view reference block in the first reference view and the second temporal reference block, wherein the second inter-view reference block is located from the location of the second temporal reference block using the current MV of the current block in the inter-view direction; and
applying encoding or decoding to current inter-view residual corresponding to a second difference between the first inter-view reference block and the current block using the inter-view residual predictor.

2. The method of claim 1, wherein the default derived MV correspond to a default value (0, 0).

3. The method of claim 1, wherein the second inter-view reference picture has a same POC (picture order count) as the current picture.

4. The method of claim 1, wherein if the current picture has a POC (picture order count) equal to POC0, the first temporal reference picture in the first reference view has the POC equal to POC1, the second temporal reference picture in the dependent view has the POC equal to POC2, the derived MV is derived based on the first MV according a ratio between (POC1−POC0) and (POC2−POC0).

5. The method of claim 1, wherein the second temporal reference picture corresponds to an ARP temporal reference picture as derived in a slice level.

6. An apparatus of inter-view ARP (advanced residual prediction) for three-dimensional or multi-view video coding, the apparatus comprising one or more electronic circuits configured to:
receive input data associated with a current block of a current picture in a dependent view;
locate a first inter-view reference block of a first inter-view reference picture in a first reference view from current block location using a current MV (motion vector) of the current block in an inter-view direction;
derive a first MV associated with the first inter-view reference block;
if the first MV points to a first temporal reference picture in the first reference view, determine a derived MV based on the first MV;
if the first MV points to a second inter-view reference picture in a second reference view, set the derived MV to a default derived MV;
identify a second temporal reference block in a second temporal reference picture corresponding to the current block using the derived MV;
generate an inter-view residual predictor corresponding to a first difference between a second inter-view reference block in the first reference view and the second temporal reference block, wherein the second inter-view reference block is located from the location of the second temporal reference block using the current MV of the current block in the inter-view direction; and
apply encoding or decoding to current inter-view residual corresponding to a second difference between the first inter-view reference block and the current block using the inter-view residual predictor.

7. The apparatus of claim 6, wherein the default derived MV correspond to a default value (0, 0).

8. The apparatus of claim 6, wherein the second inter-view reference picture has a same POC as the current picture.

9. The apparatus of claim 6, wherein if the current picture has a POC (picture order count) equal to POC0, the first temporal reference picture in the first reference view has the POC equal to POC1, the second temporal reference picture in the dependent view has the POC equal to POC2, the derived MV is derived based on the first MV according a ratio between (POC1−POC0) and (POC2−POC0).

10. The apparatus of claim 6, wherein the second temporal reference picture corresponds to an ARP temporal reference picture as derived in a slice level.

\* \* \* \* \*